(No Model.)
R. W. HUBBARD.
CORN HUSKING IMPLEMENT.
No. 409,788. Patented Aug. 27, 1889.
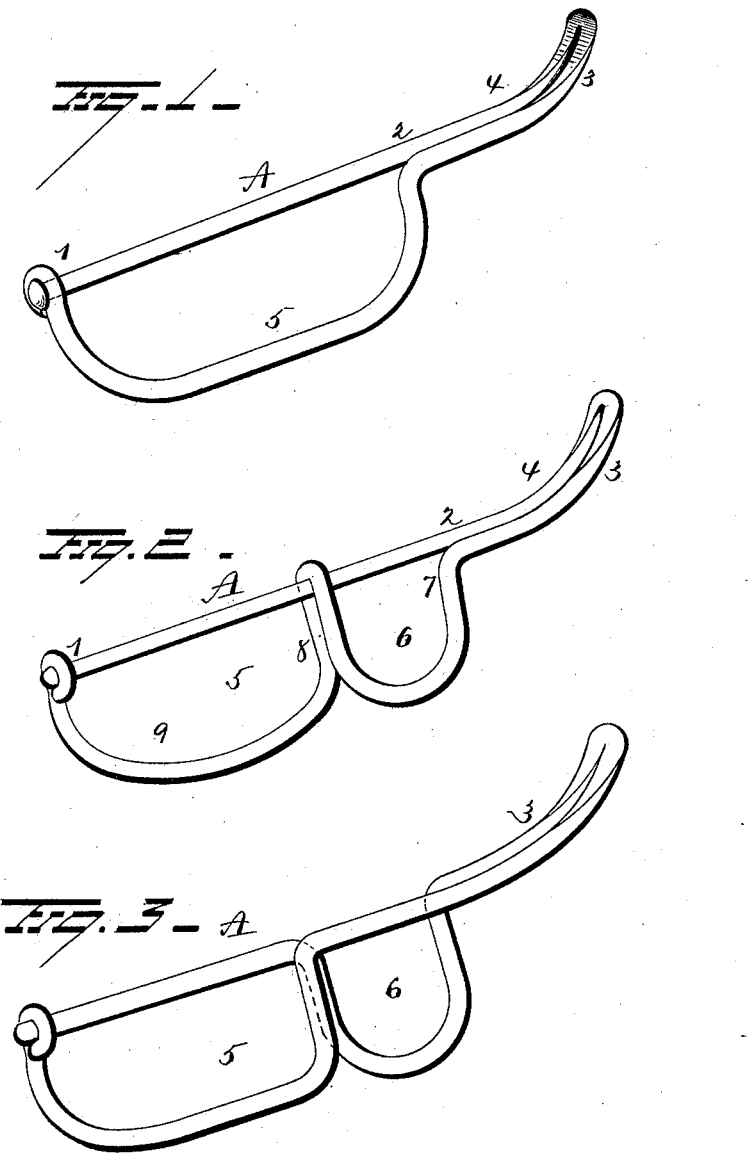

UNITED STATES PATENT OFFICE.

RICHARD W. HUBBARD, OF ASHTABULA, OHIO.

CORN-HUSKING IMPLEMENT.

SPECIFICATION forming part of Letters Patent No. 409,788, dated August 27, 1889.

Application filed May 18, 1889. Serial No. 311,275. (No model.)

*To all whom it may concern:*

Be it known that I, RICHARD W. HUBBARD, of Ashtabula, in the county of Ashtabula and State of Ohio, have invented certain new and useful Improvements in Corn-Husking Implements; and I do hereby declare the following to be a full, clear, and exact description of the invention, such as will enable others skilled in the art to which it appertains to make and use the same.

My invention relates to an improvement in corn-husking implements, the object being to combine cheapness, simplicity, and strength in the production of an article for facilitating the removal of the husks from ears of corn; and with this end in view my invention consists in certain novel features of construction and combinations of parts, as will be hereinafter fully described, and pointed out in the claims.

In the accompanying drawings, Figure 1 is a view of the preferred form, and Figs. 2 and 3 are modifications.

A represents a piece of metal—such, for example, as a piece of wire, as shown. From the end 1 to the point 2 this wire is preferably straight or about straight, and it is then bent slightly. A little beyond this bend at point 2 the wire is bent back for about a third of its length extending close to and parallel with the straight portion, thus forming the widened point 3 and the double shank 4. The wire is then bent away from the straight portion nearly at right angles thereto, and thence around and secured to the end 1 to form the loop 5 to receive the fingers of the operator. The point 3, formed by doubling the wire, is filed or otherwise flattened or sharpened, and being rounded it punctures the driest and toughest husk with perfect ease, and at the same time no corners are left to tear or scratch the fingers.

In the modification shown in Fig. 2 the point 3 is the same as in former construction and the double shank is the same; but instead of one loop only being formed for the fingers two loops 5 and 6—one large and the other small—are made by bending the wire, as shown at the points 7, 8, and 9, between and at the ends of the loops. In this device the larger loop 5 is adapted to receive three fingers and the smaller loop 6 to receive one finger.

Still another form is shown in Fig. 3. Here the small loop 6 is formed by a lateral bend in the straight portion of the wire, and then the wire is continued, as in the other two constructions, to form the double shank and the broadened, flattened, and rounded point 3. From the shank the wire is extended across the open end of loop 6, closing it, and finally this end of the wire is bent to form the large loop 5.

The devices are simple, light, easily and cheaply constructed, and effective in accomplishing the work for which they were intended.

It is evident that slight changes might be resorted to in the form and arrangement of the several parts described without departing from the spirit and scope of my invention, and hence I do not wish to limit myself to the particular construction herein set forth; but, Having fully described my invention, what I claim as new, and desire to secure by Letters Patent, is—

1. A husking implement consisting of a single wire bent to form a rounded point and double shank at one end and a handle at the opposite end, substantially as set forth.

2. A husking implement consisting of a single piece of wire bent or doubled to form a broad rounded and sharpened point, and a double shank at one end and a loop at the opposite end, substantially as set forth.

3. A husking implement consisting of a single piece of wire, a portion of which is straight and slightly bent at one end and thence doubled to form a rounded end and double shank, and finally to form a loop for the fingers, substantially as set forth.

In testimony whereof I have signed this specification in the presence of two subscribing witnesses.

RICHARD W. HUBBARD.

Witnesses:
J. F. MUNSELL,
C. H. RANDALL.